Jan. 21, 1936.  C. S. BRAGG ET AL  2,028,586

BRAKE MECHANISM FOR AUTOMOTIVE VEHICLES

Filed Nov. 8, 1927  2 Sheets-Sheet 1

Caleb S. Bragg
Victor W. Kliesrath  INVENTORS
BY
Louis Trued Whitaker  ATTORNEY

Jan. 21, 1936.   C. S. BRAGG ET AL   2,028,586
BRAKE MECHANISM FOR AUTOMOTIVE VEHICLES
Filed Nov. 8, 1927   2 Sheets-Sheet 2
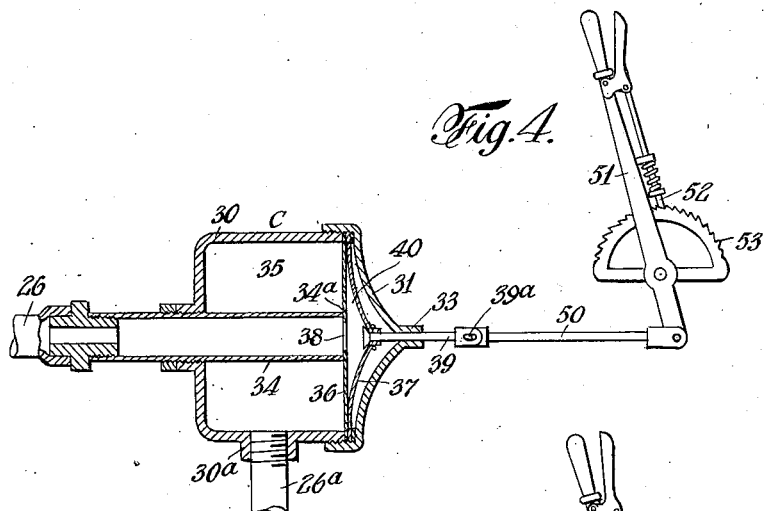
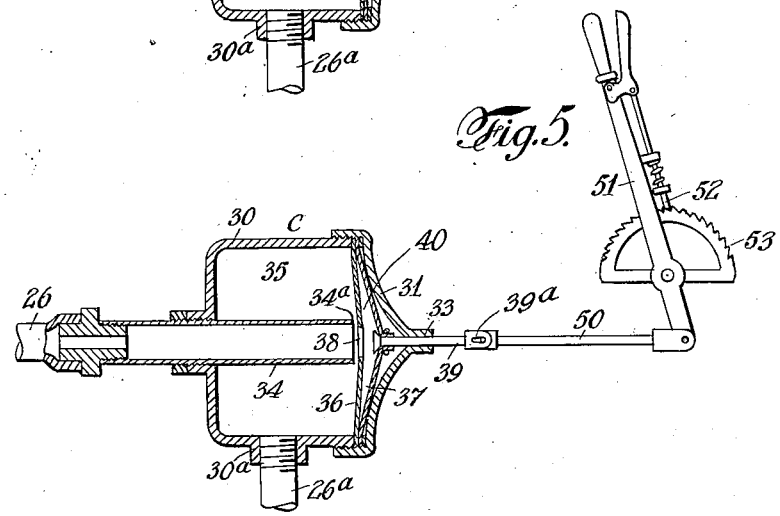
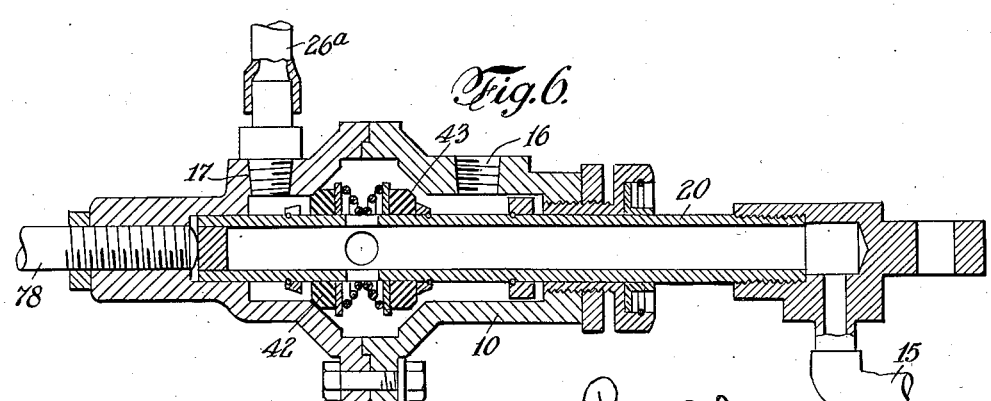

Patented Jan. 21, 1936

2,028,586

UNITED STATES PATENT OFFICE 2,028,586

BRAKE MECHANISM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a corporation of New York Application November 8, 1927, Serial No. 231,832

4 Claims. (Cl. 188—152)

Our invention consists in the novel features hereinafter described, reference being had to the accompanying drawings, which show an embodiment of the invention selected by us for purposes of illustration, and the said invention is fully disclosed in the following description and claims.

Our invention relates to suction actuated devices, employed particularly for operating the brake mechanisms of automotive vehicles in which the suction of rarification is conveniently obtained by a connection to the throttle controlled suction passage of an internal combustion engine, which drives the vehicle or vehicles, and it consists in the provision of means for automatically maintaining a constant and predetermined degree of rarification available for the operation of the suction actuated device, and for varying the degree of rarification to be so maintained, under the control of the operator, to the end that where, as is usual, the higher fluid pressure, usually atmospheric pressure, is constant, a constant predetermined differential of fluid pressures is secured which will apply the brake mechanisms (or actuate other parts to be operated) with a constant maximum power, regardless of fluctuations in the degree of rarification in the suction passage of the engine, and may be varied from time to time to meet changes in the co-efficient of friction between the wheel tires and road surface, due to variations in road conditions, variations in load of the vehicle, etc., to enable the power of the actuator to apply its maximum power to the brake mechanisms, while preventing as far as possible the locking of the wheels, and the resulting skidding of the vehicle.

In the accompanying drawings,

Fig. 4 is a view similar to Fig. 2, showing the variable pressure diaphragm in a different adjusted position.

Fig. 5 is a similar view showing the positions of the parts adjusted as in Fig. 4, when appreciable quantities of air are withdrawn from the actuator.

Fig. 6 is a sectional view of the controlling valve mechanism.

Figure 1:
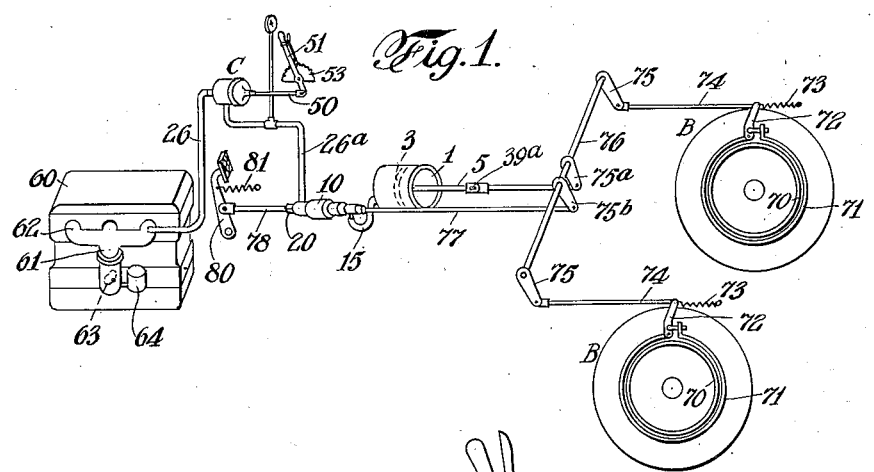
Fig. 1 is a diagrammatic view of an installation of brake mechanism in an automotive vehicle, showing our invention embodied therein.

In the diagram, Fig. 1, we have shown a simple form of power actuator consisting of a cylinder, 1, open to the atmosphere at one end and closed at the other, and having a piston, 3, in the cylinder operatively connected with brake mechanisms of the vehicle, indicated as a whole at B, which may be of any desired type, but which are shown, for example, as comprising each a brake drum, 7, brake band, 71, brake applying lever, 72, having a retracting spring, 73, said lever being connected by link rod, 74, with arms, 75, on a rock shaft, 76, having an arm, 75ª, connected with a piston rod, 5, of the piston, 3.

The actuator is provided with means for connecting the cylinder between the piston and the closed end of the cylinder with a source of suction, and with a source of higher fluid pressure, under the control of suitable controlling valve mechanism which may be of any suitable type, and may be located in the piston, or exterior to the actuator cylinder. In this instance we have shown the valve mechanism as comprising a valve casing, 10, connected by link, 78, with a foot lever, 80, having the usual retracting spring, 81, the valve casing being provided with valves, indicated at 42 and 43, operatively connected with a valve actuating part, 20, which is connected by a link, 77, with an arm, 75ᵇ, on the rock shaft, 76, thus connecting it with the piston, 3, and with brake mechanism. The particular construction of the valve mechanism, has no bearing on our present invention and will not be further described in detail, except to say that the relative movement of the valves with respect to the casing controls the actuator, and that the amount of lost motion between the valve actuating part and the valve casing is limited by suitable means to enable the operator to apply his physical force to the brake mechanism in addition to that of the actuator, or to apply the brakes directly by physical force in case of failure of power. In this instance the valve casing is connected with the forward end of the actuator cylinder by a flexible pipe, 15, and is provided with an inlet, 16, communicating with the atmosphere, or other source of higher fluid pressure, and having an outlet, 17, connected by a suction pipe, 26, 26ª, with a portion of the suction passage, 61 (as the intake manifold, 62) of an internal combustion engine, 60, for propelling the vehicle, between the throttle valve, 63, and the engine cylinders, the suction passage being provided with the usual carburetor, 64.

Figure 2:
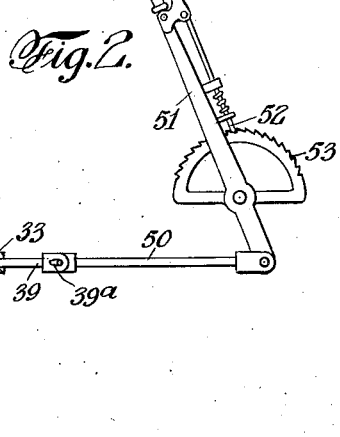
Fig. 2 is an enlarged sectional view of the pressure regulating check valve shown in Fig. 1, in its normal position when the power actuator is not in use.
Figure 3:
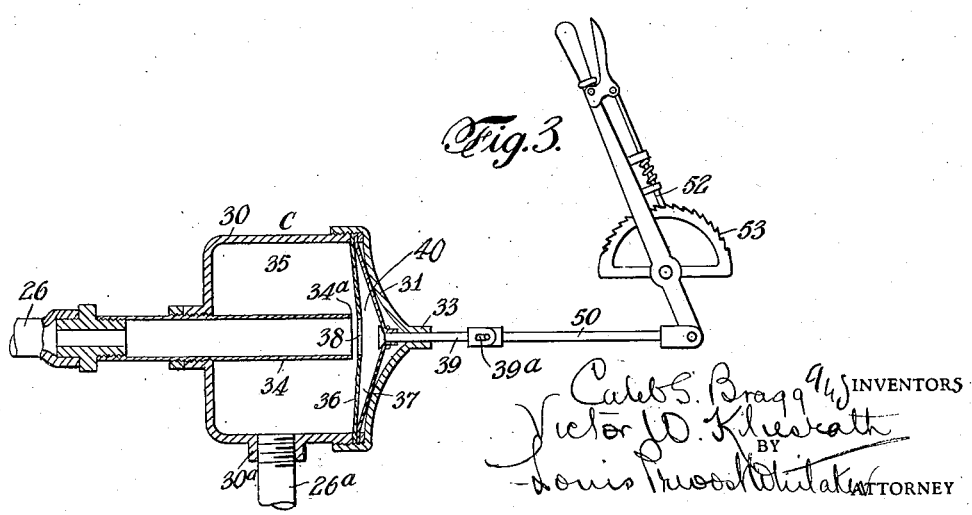
Fig. 3 is a similar view showing the positions of the parts when air is being withdrawn from the actuator.

In the suction pipe or connection, 26, is located an adjustable pressure regulating check valve, indicated as a whole at C in Fig. 1, and shown in detail in Figs. 2 and 3. The valve C, comprises a hollow body, 30, provided with a cap or cover 31, screwed or otherwise secured thereto, and provided with a centrally located guiding aperture, 33. The body, 30, is provided with a centrally located stand pipe or tubular passage, 34, having its inner end open, and in substantial alignment transversely with the end of the wall of said body, an annular chamber, 35, being formed within said body around the stand pipe, 34. 36 and 37 are two flexible diaphragms having their outer edges in sealing engagement with the valve body and preferably clamped between the body and cap or cover, as shown. The diaphragm, 36, which is in the nature of a valve, is formed of any suitable material, and normally engages the end of the central tubular passage, or stand pipe, 34, and is provided with a central aperture, 38, co-axial therewith, so constructed that the portions of the diaphragm surrounding this aperture, 38, will firmly seat upon the end or seat, 34a, of the stand pipe, 34. The second diaphragm, 37, is formed of flexible or pliable material such as molded rubber or fibrous material or rubberized fabric, and is imposed upon the outer face of the diaphragm, 36, the marginal flexible portions thereof adjacent to its outer edges within the clamped edge portions being normally in contact with the corresponding portions of the diaphragm, 36, to a predetermined extent, and the diaphragm, 37, is provided with a suitable stem, 39, connected thereto by an air tight connection and extending through the guiding aperture, 33, in the cover, and connected by a link, 50, with an adjusting lever, 51, provided with a spring actuated locking pawl, 52, engaging a ratchet segment, 53. The lever, 51, is located within easy reach of the operator (on the dash or instrument board, for example) and its locking means will permit of a very delicate adjustment of the lever which effects a corresponding adjustment of the diaphragm, 37, with respect to the diaphragm, 36. The valve mechanism just described is inserted in the suction line, by connecting the suction passage, 62, with the standpipe, 34, by a pipe, 26, which, although it is of sufficient size to operate the power actuator as quickly as possible without stalling the motor while idling, is preferably of less diameter than the standpipe, 34, to act as a restricting means, and the body, 30, is provided with a lateral aperture, 30a, communicating with the chamber, 35, and connected with a valve mechanism by a pipe, 26a.

In Fig. 2 we have illustrated the position of the parts when the full or maximum rarification produced in the suction passage, 62, (when the engine is running and the throttle valve is closed) is to be rendered available to effect the maximum differential of fluid pressures on opposite faces of the actuator piston. The diaphragm, 37, which we will term the variable pressure diaphragm, is adjusted so that it has a minimum contact between its marginal flexible portions and the diaphragm, 36. As soon as the engine is running and the throttle valve closed, the air will be exhausted from the space, 40, between the two diaphragms and from the chamber, 35, from the suction pipe, 26 and 26a, and from the valve body.

When the power actuator is operated by the operator depressing the pedal lever and moving the valves to disconnect the cylinder forward of the piston from the atmosphere and connect it with the suction pipe, 26, air will be withdrawn from the actuator cylinder, 1, into chamber, 35, of the valve body, 30, increasing the pressure on the under side of the diaphragm, 36, the outer face of which is always exposed to suction, as the space 40, between the diaphragm is always in communication with the suction passage of the engine through the aperture, 38. The diaphragm, 36, will therefore be raised from its seat, as shown in Fig. 3, and permit the air to be withdrawn into the stand pipe, and as the diaphragm, 36, is of considerable size, the slightest increase of pressure on its inner face above that on its outer face will lift it from its seat, and place the chamber, 35, in communication with the stand pipe, 34. This is an important feature of our invention, as it is undesirable to lose any appreciable part of the efficiency of the small differential of fluid pressures available, from the suction passage of an internal combustion engine, which rarely exceeds twenty inches of mercury or approximately ten pounds' pressure, for actuating the piston, 3, as any appreciable detraction therefrom to operate valve mechanism would necessitate an increase in the size of the actuator cylinder to obtain the desired maximum braking power.

The coefficient of friction between the tires of the wheels of the vehicle and the roadway, varies considerably due to conditions of the roadway, as to whether it is dry, or wet, or covered with snow or ice, for example, and also under varying loads supported by the wheels. It is very desirable not to apply the brakes with such power as to lock the wheels, as the vehicle is caused to skid and an accident may and frequently does result. Obviously a maximum braking power which may be safely applied to the wheels of a loaded vehicle on a dry roadway, without danger of locking the wheels, will lock the wheels when the vehicle is lightly loaded, or is moving over wet, or muddy or snow or ice covered roads. It is desirable, therefore, that the operator may provide just the amount of maximum available power the brakes require, without locking the wheels, under these varying conditions. It has furthermore been found desirable, and has become general practice to force the operator to do a certain amount of physical work to apply the brakes by power, and to increase the amount of physical work to be done by the operator proportionately with the amount of power exerted by the power cylinder. In most cases the physical force exerted by the driver is directly applied to the braking mechanisms, in addition to the work being done by the power cylinder or cylinders connected therewith, with the result that on wet or icy streets the operator has very little feel of the amount of work being done by the brake cylinders, due to the fact that the wheels will lock with very little pressure. The danger of skidding is furthermore increased, due to the fact that the operator has little warning before the movement of his foot has applied the brakes too powerfully. Where our present invention is used, the operator may reduce the force of the power cylinder to any desired extent, so that he has the full and natural feeling of resistance on the foot pedal at all times, regardless of road conditions, and there is therefore less danger of applying the brakes unintentionally with so much power that the wheels are locked. This is readily accomplished according to our invention, by adjusting the variable pressure diaphragm, 37, by means of the hand lever, 51, and its locking means before described. When the operator wishes to reduce the amount of vacuum, he moves the lever, 51, so as to permit the diaphragm, 37, the exterior of which is exposed to atmospheric pressure, while the inner face is exposed to suction, to be pressed adjacent to its marginal portions down upon the diaphragm, 36, where it will be held by atmospheric pressure, and thus impart said pressure to the engaged portions of the diaphragm, 36.

It will be obvious that in this adjustment of the parts more pressure within the annular chamber, 35, will be required in order to lift the diaphragm, 36, and the amount of additional pressure required to lift it under these conditions determines the difference between the vacuum existing in the suction passage of the engine, and the degree of rarification available for actuating the power actuator. To enable the operator to accurately adjust the variable pressure diaphragm, a vacuum gauge may be conveniently connected to the pipe, 26a, leading from the valve body, 30, to the actuator cylinder, as shown in Fig. 1.

As previously stated, we preferably make the interior diameter of the stand pipe, 34, greater than that of the pipe, 26, leading therefrom to the suction passage of the engine in order that the withdrawal of air from the cylinder of the actuator into the suction passage is not retarded at the check valve when the variable pressure diaphragm is adjusted to reduce the available rarification below maximum. Under these conditions, when appreciable quantities of air are withdrawn from the actuator into the chamber, 35, and pass between the diaphragm, 36, and the stand pipe, 34, into the latter, the degree of rarification within the space, 40, and within the stand pipe, 34, will be reduced before a corresponding reduction takes place in the suction pipe, 26, thereby tending to reduce the differential of pressures on opposite sides of the variable pressure diaphragm, 37, permitting this diaphragm to lift automatically, as indicated in Fig. 5, when the pressures become equalized on its opposite sides, and permitting the air to be exhausted from the cylinder as rapidly as the diameter of the suction pipe, 26, leading to the suction passage of the engine permits. This automatic lifting of the diaphragm, 37, is permitted to a certain extent by its flexibility, and we prefer to provide the connections between the stem, 39, and the lever with a slotted link connection, as indicated at 39a, for example, to facilitate this automatic action of the diaphragm, 37. It will be understood that the suction tends to draw the diaphragm downward or inward, and therefore the manual adjustment is effected by raising it.

It is obvious that when most of the air within the cylinder of the actuator has been withdrawn into the suction passage of the engine and an increase of rarification starts in the stand pipe, 26, and space, 40, the atmospheric pressure on the exterior of the diaphragm, 37, will gradually depress it to a greater and greater extent, into contact with the diaphragm, 36, transferring gradually increasing pressure upon the latter, tending to seat it, and establishing the desired predetermined differential of rarification between the chamber, 35, and the interior of the stand pipe.

It will thus be seen that the operator can adjust the pressure regulating check valve to provide and maintain automatically the desired predetermined degree of rarification desired to provide the desired maximum power braking effect, under varying conditions, to obtain efficient braking while obviating the danger of locking the wheels, and skidding, and this adjustment can be changed at any time, and from time to time, as may be necessary or desirable.

It will also be seen that the pressure regulating check valve will prevent the gaseous mixture in the suction passage of the engine from being drawn into the cylinder of the actuator, if at any time the rarification in the cylinder should exceed that in the suction passage, as any back pressure from the suction passage would be communicated to the space, 40, between the diaphragms and increase the pressure therein, thereby firmly seating the diaphragm, 36 on the stand pipe. This is particularly desirable where the actuator piston is submerged in vacuum, in the released or off position, as for example, in our former applications for Letters Patent of the United States filed January 5th, 1925, Serial No. 506, and filed March 13, 1926, Serial No. 94,412. In like manner, the diaphragm, 34, acts as a check valve to prevent fluctuations in the degree of rarification within the suction passage from being transmitted to the cylinder and piston of the actuator when the brakes are applied, and tends to keep the available power constant, and will hold the brakes as applied should the motor stall while idling.

It is to be noted particularly, that our pressure regulating valve permits the reduction of the degree of rarification available for the power actuator without the admission of air or other higher pressure fluid for that purpose, which is very important in obviating the danger of stalling the engine if idling, or interfering with its operation, and in addition our pressure regulating valve also functions as a check valve, by reason of its construction.

What we claim and desire to secure by Letters Patent is:—

1. A pressure regulating check valve comprising a closed valve chamber provided with a tubular outlet passage extending within the walls of said chamber, a movable member extending across said chamber, having edge portions in sealing engagement with said walls of said chamber, and a portion on one side of said member adapted to seat upon the inner end of said outlet passage and close communication with the surrounding portion of said valve chamber, and serve as a check valve for said tubular outlet passage, said portion of the valve chamber having an inlet aperture for higher pressure fluid, of a second movable member extending within the walls of said valve chamber having edge portions in sealing engagement with the walls of said chamber constructed to yieldingly engage the other side of the first mentioned movable member, and means for connecting the space between said movable members with said outlet passage, the outer face of the second mentioned movable member being subjected to the higher pressure fluid.

2. In power brake mechanism for an automotive vehicle, a pressure regulating check valve comprising a closed valve chamber provided with a tubular outlet passage, a movable member extending across said chamber having edge portions in sealing engagement with said walls of said chamber, and a portion on one side of said member adapted to seat upon the inner end of said outlet passage and close communication with the surrounding portion of said valve chamber and serve as a check valve for said tubular outlet passage, said portion of the valve chamber having an inlet aperture, and a second movable member extending within the walls of said valve chamber having edge portions in sealing engagement with the walls of said chamber constructed to yieldingly engage the other side of the first mentioned movable member, and means for connecting the space between said movable member with said outlet passage, the outer face of the second mentioned movable member being subjected to atmospheric pressure.

3. In a braking system for vehicles embodying brakes jointly controlled by a vacuum operated servo motor and by a control lever, the initial movement of the control lever rendering the servo motor operative and the continued movement supplementing the operation thereof in accordance with the extent of movement of said lever, a source of fluid power for said servo motor, means for reducing the effectiveness of said fluid power, and means for regulating said reducing means.

4. In an automotive vehicle brake system for use with an internal combustion engine having a suction passage, with brake mechanism, and with a suction actuated device operatively connected with said brake mechanisms, a pressure regulating check valve, comprising a closed valve chamber provided with a tubular outlet passage, said outlet passage extending within the walls of said valve chamber, a flexible diaphragm extending across said chamber within the same and having edge portions in sealing engagement therewith, and movable portions adapted to seat upon the inner end of said outlet passage and close communication with the portions of the chamber on the inner face of said diaphragm, said portions of said chamber being provided with an inlet aperture communicating with the portion of said tubular outlet passage leading to the suction actuated device, and said diaphragm being provided with an aperture in alignment with and communicating at all times with the said outlet passage to subject the diaphragm on one face to the suction in the suction passage of the engine, and means for supplying yielding resistance to said diaphragm in a direction to hold it seated, whereby said valve will automatically maintain a predetermined degree of rarification available for the suction actuated device.

CALEB S. BRAGG.
VICTOR W. KLIESRATH.